United States Patent [19]

Feutrel

[11] Patent Number: 4,594,216
[45] Date of Patent: Jun. 10, 1986

[54] SPACING GRID FOR A NUCLEAR REACTOR FUEL ELEMENT

[75] Inventor: Claude Feutrel, Vauhallan, France

[73] Assignee: Commissariat a l'Energie Atomique, Paris, France

[21] Appl. No.: 425,966

[22] Filed: Sep. 28, 1982

[30] Foreign Application Priority Data

Oct. 16, 1981 [FR] France .................. 81 19483

[51] Int. Cl.⁴ .............................................. G21C 3/34
[52] U.S. Cl. .................................. 376/442; 211/60.1; 52/668
[58] Field of Search ............... 376/442, 441, 438, 449, 376/462; 211/189, 495, 60 R; 248/68 R, 68 CB; 52/668, 820

[56] References Cited

U.S. PATENT DOCUMENTS

| 3,442,763 | 5/1969 | Chetter et al. | 376/442 X |
| 3,674,635 | 7/1972 | Anthony et al. | 376/441 |
| 3,715,275 | 2/1973 | Krawiec | 376/442 |
| 3,791,466 | 2/1974 | Patterson et al. | 376/442 |
| 4,058,436 | 11/1977 | Anthony | 376/442 X |
| 4,125,434 | 11/1978 | Fromel et al. | 376/442 X |
| 4,125,435 | 11/1978 | Jabsen | 376/442 |
| 4,160,477 | 7/1979 | Roffler | 376/442 X |
| 4,175,003 | 11/1979 | Beuchel et al. | 376/442 |
| 4,221,636 | 9/1980 | Feutrel | 376/441 |
| 4,297,170 | 10/1981 | Leclercq | 376/442 |

FOREIGN PATENT DOCUMENTS

| 1439362 | 4/1969 | Fed. Rep. of Germany . |
| 1514559 | 6/1969 | Fed. Rep. of Germany . |
| 2602124 | 5/1977 | Fed. Rep. of Germany . |
| 2083628 | 12/1971 | France . |
| 2457544 | 12/1980 | France . |
| 0039092 | 3/1977 | Japan . |
| 0078144 | 9/1977 | Luxembourg . |

Primary Examiner—Deborah L. Kyle
Assistant Examiner—Dan Wasil

[57] ABSTRACT

It has two groups of thin partitions, which are parallel in one group and perpendicular from one group to the next, which are grooved and nested to define square cavities. Support points are made in the walls of the cavity to hold in place the fuel elements. In each group, a thin partition is constituted by two superimposed sheets. The height of the first sheet is equal to double the height of the second sheet. A first sheet is positioned above the second sheet in one of the groups and below the latter in the other group. Each second sheet is nested into the first sheet of the other group.

8 Claims, 8 Drawing Figures

SPACING GRID FOR A NUCLEAR REACTOR FUEL ELEMENT

BACKGROUND OF THE INVENTION

The present invention relates to a spacing grid for a fuel element of a nuclear reactor.

The spacing grids serve to space a group of nuclear fuel elements in a nuclear reactor fuel assembly. These elements must be kept parallel to one another in accordance with a given system. For this purpose these elements are supported in accordance with different successive levels distributed in lengthwise manner, in order in particular to prevent their vibration under the effect of the circulation of a liquid cooling medium flowing in contact therewith.

Numerous spacing grid constructions of the aforementioned type are already known, which are in particular formed by means of an arrangement consisting of two groups of perforated thin sheets, parallel in each group and perpendicular from one group to the next. These sheets are slotted at regular intervals, so as to permit their nesting, which defines cavities having a square cross-section, each of which is traversed by a fuel element of the group. In order to ensure the necessary elastic support on the fuel elements, the sheets are appropriately cut and nested, so as to have towards the interior of each cavity bosses in relief and tongues forming springs. Each fuel element in a cavity is applied by a spring against two fixed supports provided on one of the sheets under the effect of the tongue formed in the opposite parallel sheet.

An example of a spacing grid of this type is described in French Pat. No. 79 13 015, filed on 22.5.1979 in the name of the C.E.A. and entitled "Spacing grid for a group of fuel elements of a nuclear reactor".

A grid having this function can be made entirely from zircalloy, which is an advantage because this metal has a low neutron absorption and it is not then necessary to use, for the formation of springs, joined members made from a material such as inconel, having a much higher neutron absorption.

BRIEF SUMMARY OF THE INVENTION

The invention relates to a spacing grid which, whilst retaining the advantage of being entirely manufacturable from zircalloy, has an increased stiffness with respect to transverse stresses, as compared with grids of the known type.

Thus, the prior art spacing grids are grooved or indented at regular intervals, so as to permit their nesting. It is necessary for the grooves to extend over half the height of each sheet. The length of these grooves reduces the rigidity or stiffness of the spacing grid.

According to the invention, the height of these grooves is reduced by superimposing two sheets in the extension of one another in order to form a thin partition. This configuration improves the rigidity of the walls, because the height of the grooves is reduced.

More specifically the present invention relates to a spacing grid for a group of fuel elements for a nuclear reactor of the type comprising an assembly of two groups of thin partitions, parallel in each group and perpendicular from one group to the next, which are grooved at regular intervals so as to permit their nesting, in order to define cavities having a square cross-section, each traversed by a fuel element of the group, support points being made in the walls of the cavity in order to hold in place the fuel elements of the group, wherein in each group, a thin partition is formed by two sheets superimposed in the extension of one another, respectively a first sheet and a second sheet, the height of the first sheet being equal to double the height of the second sheet, a first sheet being located above the second sheet in one of the groups and below it in the other group, each second sheet being nested into the first sheet of the other group.

According to a second feature of the invention, the rigidity of the spacing grid is further increased by the fact that each of the support points for the fuel elements is located on an ungrooved area of the sheets forming the grid.

Thus, a shortcoming of the known spacing grids formed by sheets fitted into one another is that at least part of the support points of the fuel elements is located on the slotted areas of said sheets. These areas are obviously less rigid than the unslotted areas.

The spacing grid according to the invention obviates this disadvantage, in that the support points of the fuel elements are all disposed in an ungrooved area of the sheets.

In addition, the present invention relates to a spacing grid for a group of fuel elements for a nuclear reactor, of the type comprising an assembly of two groups of thin partitions parallel in one group and perpendicular between one group and the next, grooved at regular intervals, so as to permit their nesting in order to define cavities having a square cross-section, each traversed by a fuel rod of the group, supports being made in the walls of the cavity in order to hold in place the fuel elements of the group, wherein each of the said support points is located on an ungrooved area of the said sheets.

The two above features make it possible to assemble together the sheets by continuously made beads of welding spots, which further improves the rigidity of the grid produced according to the invention.

Moreover, it is known that the spacing grids are interconnected by guide tubes. The invention also relates to a grid having sleeves for connecting to the guide tube integrated into the said grid, which permit a simple sliding positioning of the grids on the guide tube.

The invention also relates to a spacing grid comprising as assembly of two groups of thin partitions, which are parallel in one group and perpendicular from one group to the next, grooved at regular intervals so as to permit their nesting and in order to define cavities having a square cross-section, each traversed by a fuel element of the group, wherein the four upper and lower faces forming the four faces of a cavity traversed by a connecting guide tube of the grid are extended by sheet metal tongues, interconnected to form a cylindrical sleeve connecting the grid to the guide tubes.

The tongues are interconnected by overlapping and welding or, according to a variant, the lateral edges of the tongues are turned in such a way that their lips are assembled by a vertical bead of welding spots.

BRIEF DESCRIPTION OF THE DRAWINGS

The invention is described in greater detail hereinafter relative to non-limitative embodiments and with reference to the attached drawings. wherein show:

FIGS. 5 and 7 two details showing in perspective two constructional variants of a frame edge of the grid according to the invention.

DETAILED DESCRIPTION OF THE PREFERRED EMBODIMENTS

Figure 1:
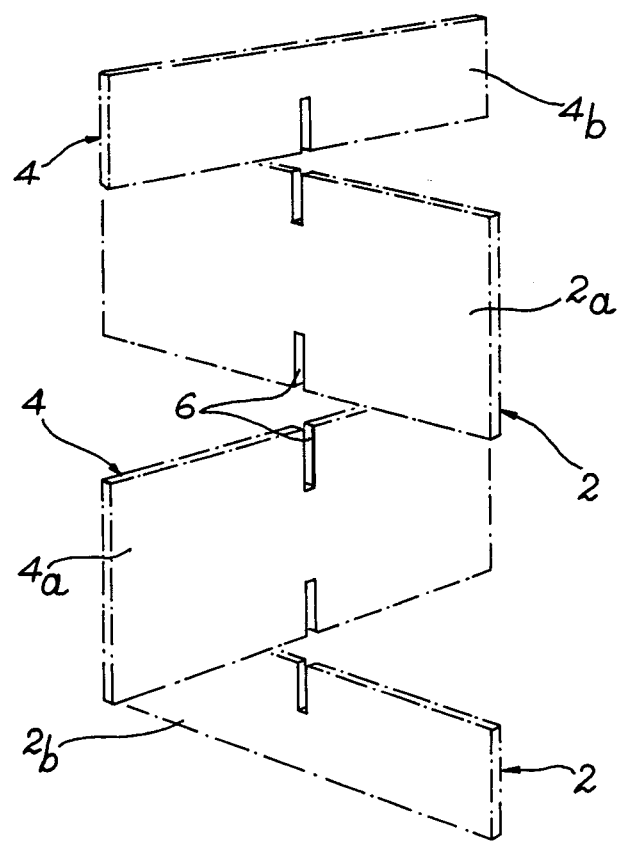
FIG. 1 a perspective view showing the nesting of four sheets constituting a grid constructed according to the invention.

FIG. 1 is a perspective view showing the nesting of four sheets of a spacing grid according to the invention. Such grids keep at regular intervals the fuel elements of nuclear reactor assemblies. In each case they comprise an outer frame constituted by lateral plates, appropriately joined to one another by their contacting ends, as is apparent from the two versions of FIGS. 6 and 7. Within the frame formed by the lateral plates are installed two groups of transverse sheets, which are parallel to one another in the same group and perpendicular to one another from one group to the next, in such a way that they define a series of cavities in which engage the fuel elements of the group.

According to the invention each partition 2, 4 is formed by superimposing two sheets 2a, 2b and 4a, 4b located in the extension of one another. The height of the first sheet of each group, respectively 2a, 4a is equal to double the height of the second sheet 2b, 4b. In one of the groups, the first sheet 2a is located above the other sheet 2b, whilst in the other group, the first sheet 4a is located beneath sheet 4b. Each of these four sheets has nesting slots 6 made at regular intervals and which permit the nesting of the sheets in one another. Sheet 2b engages in the sheet 4a, which engages in sheet 2a. Finally sheet 4b engages in slots made in the upper part of sheet 2a.

Figure 2:
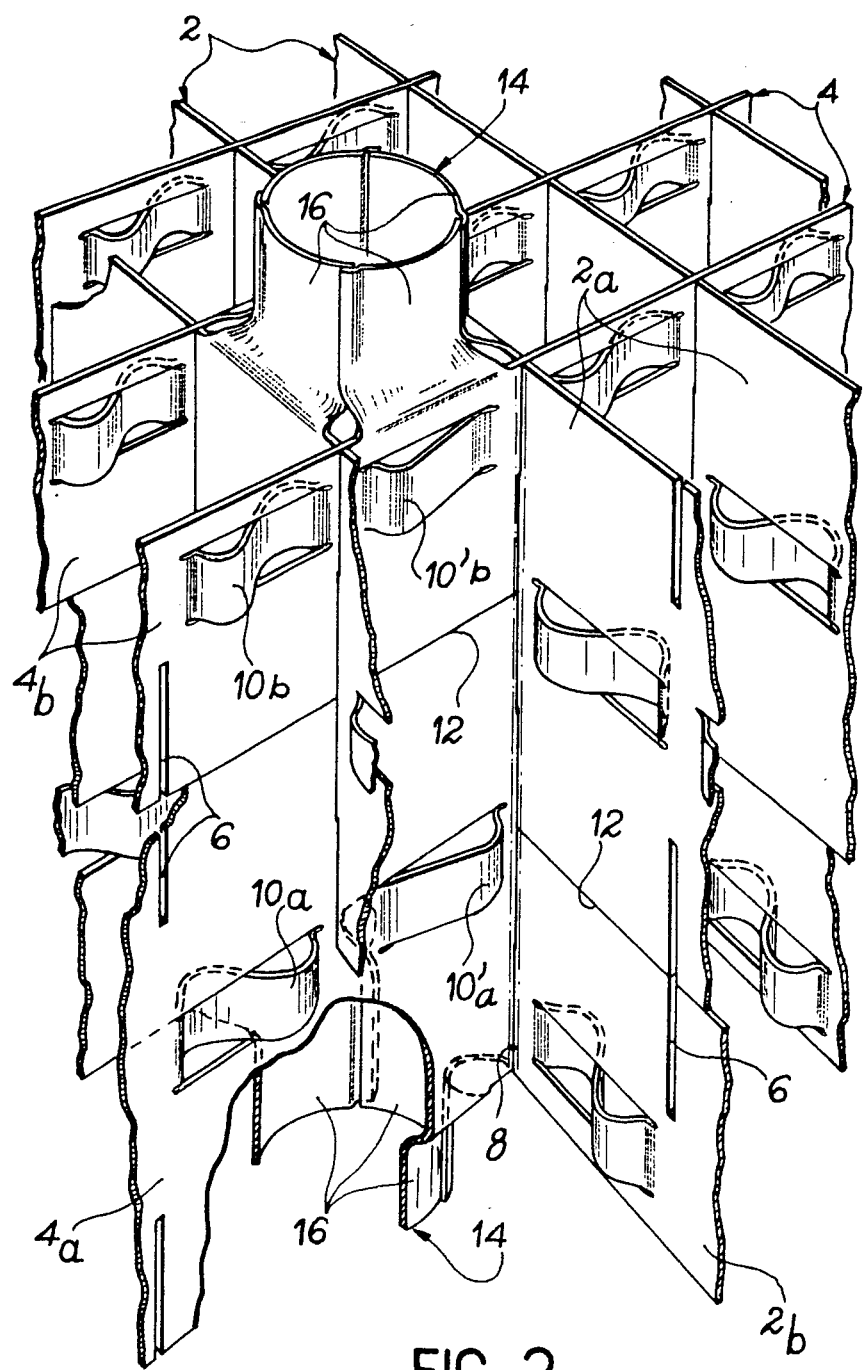
FIG. 2 a perspective view of a preferred embodiment of a grid according to the invention.

FIG. 2 is a perspective view of an embodiment of the invention. The four sheets, shown spaced apart in FIG. 1 have been assembled in the final position. These sheets, constituting partitions, are given the same references as in FIG. 1. It can be seen that each of the partitions of the grid is formed in the same way by superimposing two sheets, respectively a first sheet 2a, 4a and a second sheet 2b, 4b, whose height is half that of the first sheet.

The sheets are assembled with one another by beads of welding points 8 formed by an appropriate means, e.g. a laser, along dihedrons formed by planes of the partitions. The fact that each of the partitions of the grid is formed from two portions makes it possible to successively produce a substantially continuous bead of welding spots. Thus, in the case of the prior art girds, the dimensions of each cavity and in particular its cross-section which is relatively small compared with its length, does not make it possible to have access along the complete edge and consequently does not make it possible to produce a continuous bead of welding spots.

The order of the welding operations is as follows: firstly sheets 2a and 4a are welded to one another, then sheet 2b is welded to sheet 4a and finally sheet 4b is welded to sheet 2a.

Figure 3:
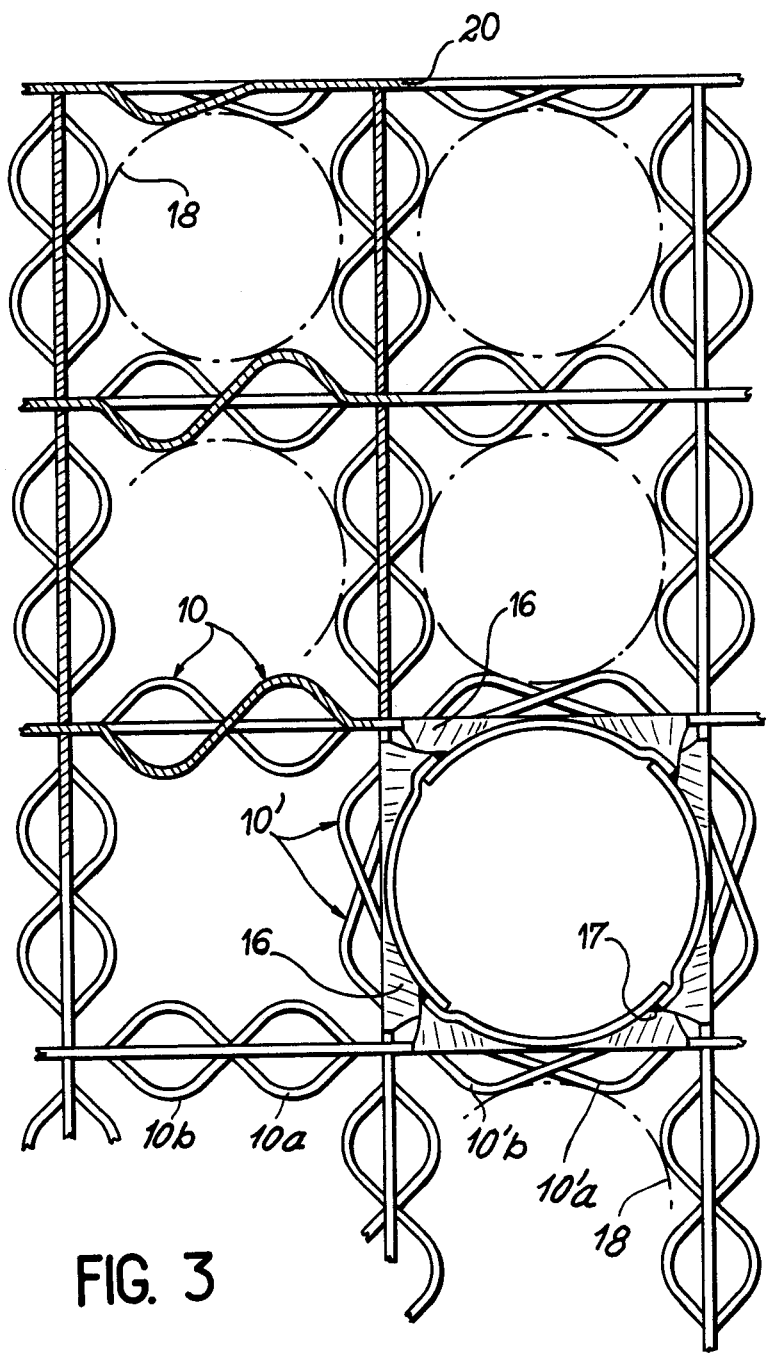
FIG. 3 a plan view in particular showing the construction of the sleeves for the passage of the guide tubes integrated into the grid.

Bosses or bridges 10 are made in each of the sheets. Each boss is in the form of a horizontal sheet strip having a horizontal median plane of symmetry at half its height. As can be seen in FIG. 3, in plan view, said bosses are shaped like an S, whose apex is located in a cavity, whilst the other apex is located in the adjacent cavity. A boss is made in sheet 2a, whilst another boss is made in sheet 2b (respectively 4a, 4b). These bosses 10 are formed by stamping between two dies having an S-shaped profile. Thus, each face of the cavity has two bosses 10 at different levels in the different planes and acting on different generatrixes of the rod. As the cavity has four faces, there are eight bosses within each cavity. References 10a, 10b designate bridges or bosses made in a partition of a cavity. According to a feature of the grid according to the invention, each of these bosses is disposed in an ungrooved area of the sheet in which it is made. Boss 10a is made in the central part of sheet 4a. It can be seen that two grooves 6 are respectively made above and below sheet 4a. As can be seen in FIG. 2, the boss 10a is located in an ungrooved area. This construction improves the rigidity of the grid.

In an identical manner, it can be seen that sheet 4b, in which is made boss 10b, has in its lower part a groove and that boss 10b, made in the upper part of sheet 4b is located in an ungrooved area. The plane of symmetry of bosses 10 made in plate 2a coincides with the joining plane 12 of sheets 4a, 4b. In the same way the plane of symmetry of each of the bosses 10 made in the first sheet 4a coincides with the joining plane 12 of sheets 2a, 2b.

The interference of bosses or bridges 10 between the cavities of the grid ensures the overall cohesion of the system. Thus, the apices of the bosses form two independent support points on either side of each partition. Thus, compensation takes place between one cavity and the next of the relative deformations between grids and rods.

Within a certain number of cavities of the group, there are guide tubes and not fuel elements. These guide tubes maintain in space and also serve to space the grids between the two end pieces of the assembly. The grid according to the invention has in its lower part and in its upper part connecting sleeves for these guide tubes. Sleeves 14 are formed by sheet metal tongues 16, located in the extension of the partitions forming the grid. Each of the tongues 16 is formed by stamping in order to constitute a cylindrical sleeve, whose diameter corresponds to that of the guide tube. In the embodiment of FIG. 2, the sheet metal tongues 16, 14 are interconnected by overlapping and by a vertical longitudinal bead of welding spots.

As can be seen, the bosses 10'a, 10'b made in the four faces of the cavity traversed by the guide tube are different, because it is not necessary to have supports for the guide tube within the cavity in question. Hence, these bosses 10a project from a single face of the sheet.

FIG. 3 is a plan view of the grid of FIG. 2. This view in particular shows the S-shape of the bosses 10, whose apices come into contact with the fuel elements 18, shown in mixed line form, and which traverse the cavities. In the same way as bosses 10a, 10b, bosses 10'a and 10'b are located in an unslotted area of the wall of the cavities. Bridge 10'a is located in the centre of the sheet 4a, because there are grooves 6 above and below said sheet 4a. In the same way, bridge 10'b has been made in the upper part of sheet 4b, because there are grooves 6 in its lower part. As stated hereinbefore, the object of this arrangement is to increase the stiffness of the grid.

It can also be seen that the plates forming the outer frame of the grid, like plate 20, have bridges which, like bridge 10' made in the faces of a cavity within which passes a guide tube, project on one side only of the plate.

Finally, it is possible to see the overlap of the sheet metal tongues 16 forming a sleeve integrated into the holding grid for its connection to the guide tubes, as well as the longitudinal bead of welding point 17 by which they are assembled.

Figure 4:
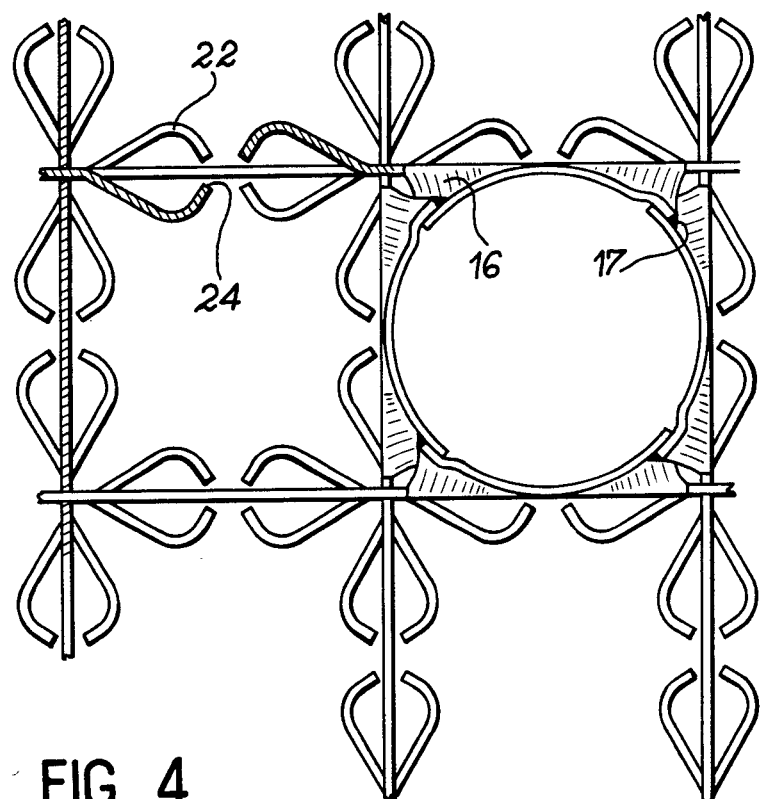
FIGS. 4 and 4a a plan view and a perspective view respectively of an embodiment differing from the previous embodiment through the construction of support bosses or bridges for the nuclear fuel elements.
Figure 4A:
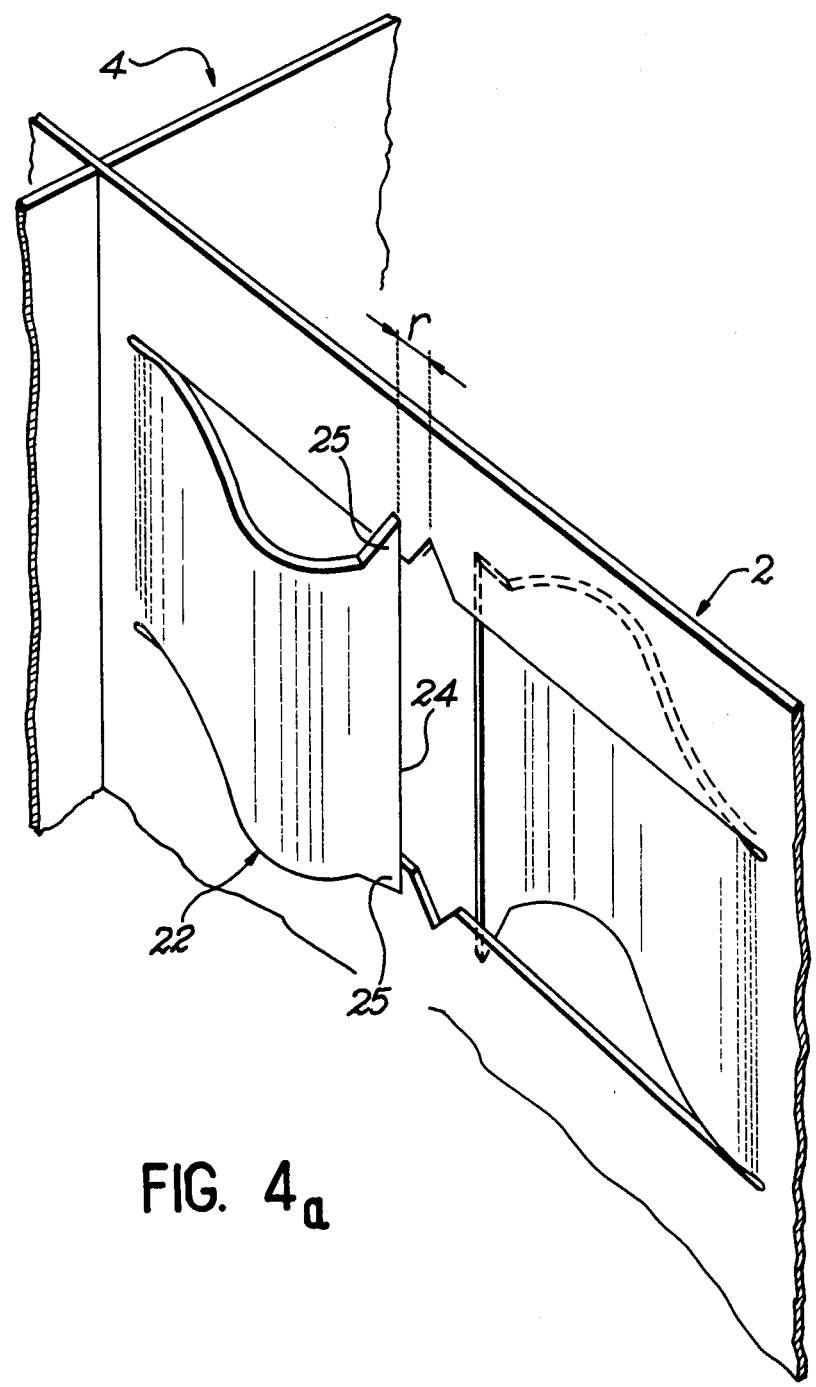

FIGS. 4 and 4a show a constructional variant of the grid according to the invention. This variant differs from that of FIG. 2 by the shape of the bosses, which are then tongues against which bear the fuel elements. These horizontal tongues are formed from sheets and have a horizontal median plane of symmetry, like the bridges of the preceding embodiment. At their free end 24, tongues 22 have two small symmetrical shoulders 25, produced by cutting. These tongues 22 are mede in two operations. They are firstly cut by planar shearing and are then shaped between two appropriately shaped dies. During shaping, said shoulders are retracted by an amount r corresponding to the profile thereof and are consequently located in a position spaced from the orifice resulting from the cutting thereof. Thus, the shoulders 25 can bear against the edges of this orifice. The travel is limited to a value corresponding to the clearance necessary for absorbing manufacturing tolerances.

The rigidity of bridges 22 can be more easily adjusted in favour of a shaping correction than in the case of bridges 10.

Figure 5:
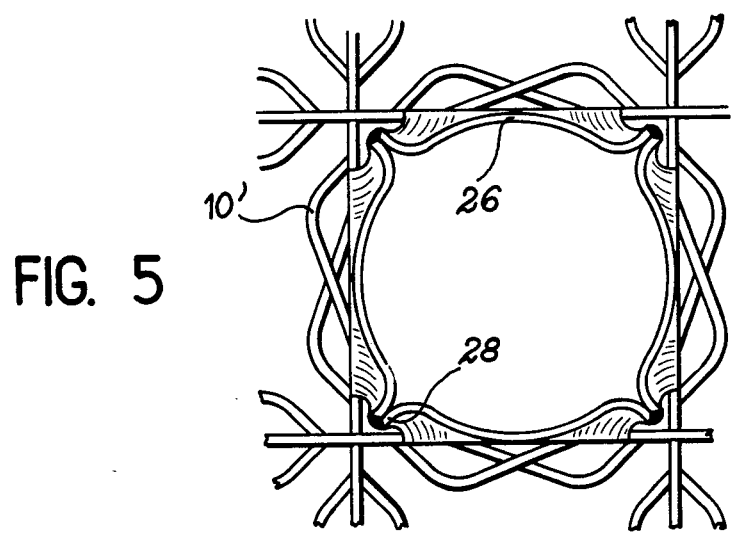
FIG. 5 a constructional variant of the sleeves for holding in place the guide tubes.

FIG. 5 shows a variant of the integrated holding sleeves for the guide tubes. As can be seen, the sheet metal tongues 26 located in the extension of the sheets forming the grid are deformed and associated in order to constitute a cylinder, whose diameter corresponds to that of the guide tube. The lateral portion of each of the two vertical sides of the tongues 26 is turned over, so that they contact in pairs. The lips 28 are assembled to one another by a vertical welding bead.

Figure 6:
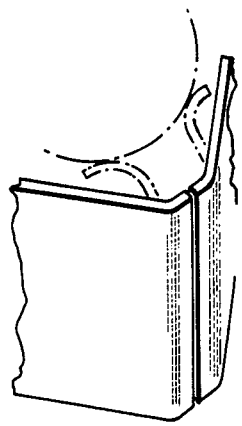
Figure 7:
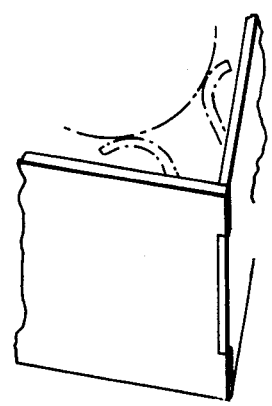

FIGS. 6 and 7 show two constructional variants of the edges of the frame constituted by the outer sheets of the grid. In the variant of FIG. 6, the ends of the sheets are bent by 45°, so that their vertical borders are in contact with one another. They are then assembled by a welding bead. In FIG. 7 the sheets are assembled by mortise and tenon, before being welded.

We claim:

1. In a nuclear reactor fuel assembly having a plurality of fuel elements, a spacing grid for laterally spacing said fuel elements comprising:
   no more than two types of sheets including
   a first type of sheets, said first type of sheets having a rectangular shape and having a first longitudinal side and a second longitudinal side, and two lateral sides, said lateral sides having a first sheet height as measured between said longitudinal sides, said first longitudinal side and said second longitudinal side of said sheets being formed with a plurality of slots spaced with a first regular interval and extending perpendicular to said longitudinal sides, the slots in said first longitudinal side being aligned with the slots in said second longitudinal side, the slots in said first longitudinal side being formed in a first rectangular area having a height equal to a quarter of the first sheet height, the slots in said second longitudinal side being formed in a second rectangular area having a height equal to a quarter of the first sheet height, each of said slots having a height equal to a quarter of the first sheet height, and
   a second type of sheets, said second type of sheets having a rectangular shape, and having a first longitudinal side edge and a second longitudinal side edge and two lateral side edges, said lateral side edges having a second sheet height as measured between said longitudinal side edges, said first longitudinal side edge of said second type sheets being formed with a plurality of second slots perpendicular to said longitudinal side edges and spaced with a second regular interval, said first and second regular intervals being equal, the second slots in said first longitudinal side edges of said second type of sheets being formed in a third rectangular area having a height equal to a half of the second sheet height, each slot having a height equal to a half of the second sheet height,
   the first sheet height being double the second sheet height, the grid being comprised solely of a first group and a second group of partitions, parallel in each group and perpendicular from one group to the other, any partition in each of said first and second groups being comprised of both said first and second types of sheets, a first type of sheet being located above and contiguous to a second type of sheet in said first group, a second type of sheet being located above and contiguous to a first type of sheets in said second group, all of said first type of sheets of said first group being contiguous to said second type of sheets of said second group, all of said second type of sheets of said second group being contiguous to said first type of sheets of said first group, the slots in said first side of said second types of sheets of said first group being engaged in the slots in said first side of said first type of sheets of said second group, the slots in said second side of said first type of sheets of said second group being engaged in the slots in said second side of said first type of sheets of said first group, the slots in said first side of said first type of sheets of said first group being engaged in the slots in said first side of said second type of sheets of said second group in order to interengage said sheets in an orthogonal manner to define open-ended cavities having a square cross-section which are bounded by sheets at all locations other than the ends, each cavity being traversed by a fuel element, said first and second types of sheets of said first group and said first and second types of sheets of said second group further including bridges, formed to have an S-shape to define apices for forming fuel element support points in each cavity, one of the apices of each S-shaped bridge being located in one cavity and the other apex in an adjacent cavity, the fuel elements bearing against the apices of these bridges, said bridges being located entirely outside said first and second rectangular areas of said first type of sheets, and entirely outside said third rectangular areas of said second type of sheets.

2. A spacing grid according to claim 1, wherein the sheets are assembled to one another by substantially continuous beads of welding spots.

3. A spacing grid according to claim 1, wherein the bridges are opposed in pairs and distributed over four different levels, the bridges having a median plane of symmetry, the median plane of the bridges coinciding with the median plane of the unnotched areas of the said sheets.

4. A spacing grid according to claim 1, having horizontal tongues cut from the walls of the cavities and stamped to form supports for the fuel element traversing the cavities, the free end of the tongue having two lateral lugs, which bear, after shaping the tongue, against the edge of the opening left by the cutting operation thereof.

5. A spacing grid as defined in claim 1 wherein the faces of the sheets forming a cavity in the upper part of the grid are extended by sheet metal tongues, interconnected to form a cylindrical sleeve 6. A spacing grid according to claim 5, wherein the tongues are interconnected by overlapping and welding.

7. A spacing grid according to claim 5, wherein the lateral edges of the tongues are turned up in such a way that their lips are assembled by a vertical bead of welding spots.

8. A spacing grid according to claim 1, wherein all the S-shaped stamped sheet metal bridges are extend in a direction perpendicular to the direction of the slots in said sheets.

* * * * *